United States Patent Office 3,249,546
Patented May 3, 1966

3,249,546
AZEOTROPE REFRIGERANT COMPOSITIONS
Bernhardt J. Eiseman, Jr., Wilmington, Del., assignor to E. I. du Pont de Nemours and Company, Wilmington, Del., a corporation of Delaware
No Drawing. Filed June 25, 1964, Ser. No. 378,032
3 Claims. (Cl. 252—67)

This application is a continuation-in-part of my copending application Serial No. 319,995, filed October 30, 1963, now abandoned.

This invention relates to novel compositions consisting of trichloromonofluoromethane and isopentane which have azeotrope-like characteristics and to a method of operating centrifugal compressor refrigeration systems with said compositions as the refrigerants.

An azeotrope is a mixture of two mutually soluble compounds which has a constant boiling point and a constant distillate composition. The formation of azeotropes cannot be predicted although many attempts have been made to do so. Azeotropes are valuable in many cases because they possess beneficial properties which are not possessed by either of the components of the mixture.

Trichloromonofluoromethane is a well known compound which is useful for a vareity of purposes and, particularly, is used as a refrigerant in centrifugal compressor refrigeration systems. Such systems include centrifugal compressor units containing impellers having blades or vanes of aluminum or iron, and flooded evaporators which may contain several thousand pounds of refrigerant. Centrifugal compressor refrigeration systems are well known and are described in detail in Americal Society of Heating, Refrigeration and Air Conditioning Engineers, Guide and Data Book, 1963, Fundamentals and Equipment.

It is an object of this invention to provide a novel azeotropic composition which consists of trichloromonofluoromethane and isopentane. Another object is to provide novel compositions which consist of trichloromonofluoromethane and isopentane that include said azeotropic composition and other mixtures of those compounds which have azeotrope-like characteristics. A further object is to provide an improvement in the method of operating centrifugal compressor refrigeration systems by employing as the refrigerants in such systems the novel azeotropic composition and azeotrope-like compositions which have unobvious and unexpected beneficial properties not possessed by pure trichloromonofluoromethane and which advantageously can be substituted for pure trichloromonofluoromethane. Other objects are to provide new compositions of matter and to advance the art. Still other objects will appear hereinafter.

Some of the above and other objects may be accomplished in accord with this invention which comprises a composition which has a substantially constant boiling point at 760 mm. Hg pressure, whose vapor has a composition substantially the same as that of the liquid at that boiling point and which has no flash point when measured by the Tag open cup method, which composition consists of (A) From 99.5% to 82% by weight of trichloromonofluoromethane and
(B) From 0.5% to 18% by weight of isopentane, and particularly an azeotropic composition having a boiling point of about 74.5° F. at 760 mm. Hg pressure and consisting of (A) About 92% by weight of trichloromonofluoromethane and
(B) About 8% by weight of isopentane.

Other objects of this invention are accomplished by operating a centrifugal compressor refrigeration system with a refrigerant which is a composition as defined above.

Trichloromonofluoromethane ($CFCl_3$) has a boiling point of 74.78° F. (23.77° C.) at 760 mm. Hg pressure. Isopentane [$(CH_3)_2CH—CH_2CH_3$] has a boiling point of 82.22° F. (27.90° C.) at 760 mm. Hg pressure. It has been found that fractional distillation of a mixture of trichloromonofluoromethane and isopentane gives an azeotropic composition consisting of about 92% by weight of trichloromonofluoromethane and about 8% by weight isopentane, having a boiling point of about 74.5° F. (about 23.61° C.) at 760 mm. Hg pressure. Redistillation of the azeotrope does not result in any change in composition, the entire azeotrope distilling at a constant boiling point and composition.

Furthermore, it has been found that other mixtures of trichloromonofluoromethane and isopentane (other than said azeotropic composition) in which the composition ranges from 99.5% by weight of trichloromonofluoromethane and 0.5% by weight of isopentane to 82% by weight of trichloromonofluoromethane and 18% by weight of isopentane also behave very much like an azeotrope. Such other mixtures have substantially constant boiling points of about 23.8° C. (about 74.84° F.) at normal atmospheric pressure (i.e. 760 mm. Hg pressure) and the vapors thereof at such boiling points have substantially the same composition as the liquids. In other words, when any such mixture, containing from 0.5% to 18% by weight of isopentane, is distilled under atmospheric pressure by normal methods and the boiling point and the composition of the vapor and liquid are measured by usual methods, the boiling point appears to be constant (within experimental error) and the composition of the vapor phase appears to be identical with that of the liquid phase (within experimental error), no fractionation occurring, whereby each mixture in that broad range has azeotrope-like characteristics. The determination of the true azeotrope, consisting of about 92% by weight of trichloromonofluoromethane and about 8% by weight of isopentane, requires unusually careful fractional distillation conditions and unusually sensitive methods of measurement of the boiling paoint and of the composition of the vapor.

The azeotrope, although it contains 8% by weight of isopentane, is nonflammable. The azeotrope-like compositions, containing up to about 12% by weight of isopentane are nonflammable as determined by the Interstate Commerce Commission (I.C.C.) closed drum test, and those containing up to 18% of isopentane have no flash point when measured by the Tag open cup method and hence are considered to be substantially nonflammable.

The compositions of this invention, containing from 0.5% to 18% by weight of isopentane, are excellent solvents for certain specialty uses such as cleaning sensitive electronic components and the like using the procedures described by Bennett and Parmelee in U.S. Patent 2,999,816; Bower in U.S. Patent 2,999,817; or Eiseman in U.S. Patent 2,999,815.

Another use for the compositions of this invention is for the cleaning of burned-out, hermetically sealed compressors of refrigeration or air conditioning units. The compositions are good solvents for greases, oils and varnishes, etc. which must be removed from the burned-out units. Since they are less dense and cost less per pound than trichloromonofluoromethane, there are appreciable savings to the user.

The compositions of this invention are also useful as blowing agents for foaming plastics, particularly the polyurethane types. They have higher vapor pressures and higher latent heats of vaporization (calcd. 83.2 B.t.u./lb. for the azetrope) than pure trichloromonofluoromethane (78.8 B.t.u./lb.), which offer the advantages of causing expansion at slightly lower temperatures and of removing somewhat more heat from the mass than pure trichloromonofluoromethane.

The azeotropic composition and the azeotrope-like compositions of this invention are particularly useful as the refrigerants in centrifugal compressor refrigeration systems, and particularly for replacing pure trichloromonofluoromethane in such systems. They have advantages over trichloromonofluoromethane in that (1) they are less costly and (2) provide better performance in such systems due to (a) higher vapor pressures, (b) higher velocity of sound which permits higher rotational speeds in the centrifugal compressor, and (c) they have higher ignition temperatures in contact with the impeller blades. Thus, the substitution of the compositions of this invention for pure trichloromonofluoromethane results in (1) lower cost, (2) an increase in the cooling capacity of the system due to the higher vapor pressures and the higher velocity of sound, and (3) greater safety due to the higher ignition temperatures.

The compositions of 99.5% to 82% by weight of trichloromonofluoromethane and 0.5% to 18% by weight of isopentane have lower gas densities than pure trichloromonofluoromethane, whereby the velocity of sound through the compositions will be higher than in the pure trichloromonofluoromethane. This permits the use of higher rotational speeds in the centrifugal compressor without having the tips of the impeller blades exceed the velocity of sound through the refrigerant, which would produce the same effects as are observed with any other object passing through the so-called sound barrier, i.e. results in the generation of heat, shock waves, vibrations, and the like, which effects would be highly objectionable in a centrifugal compressor system.

When trichloromonofluoromethane is brought into contact with metals, such as aluminum and iron, at a sufficiently high temperature, the trichloromonofluoromethane reacts with the metal so violently that ignition occurs. Occasional, in centrifugal compressors employing pure trichloromonofluoromethane as the refrigerant, the impeller becomes misaligned and the vanes come in contact with the stationary parts of the compressor. In some cases, sufficient heat has been developed from the friction during this contact to ignite the vanes and the trichloromonofluoromethane. It has been found that such reaction is inhibited by employing the compositions of this invention in place of pure trichloromonofluoromethane, the combination of 0.5% to 18% by weight of the isopentane with the trichloromonofluoromethane causing the ignition temperature to be raised by about 130° F. to about 240° F. These proportions of isopentane appear to be critical. If the concentration of the isopentane in the composition is decreased materially below 0.5% by weight, the effect on the ignition temperature is insufficient to have any practical value. Increase in the concentartion of isopentane above 18% by weight results in flammable compositions. Therefore, the use of the azeotropic composition of this invention in centrifugal compressor refrigeration systems in place of pure trichloromonofluoromethane materially reduces the danger of ignition in the system.

It is difficult, in operating centrifugal compressors, to reliably reproduce the conditions which caues ignition therein. Accordingly, the inhibiting effects of isopentane on ignition of hot metals, such as aluminum and iron, in the presence of trichloromonofluoromethane is demonstrated in Examples 1 to 4 below wherein more reproducible conditions are employed.

EXAMPLE 1

A five gram ball of aluminum 2S wire (AWG #22 gauge) was placed in the center of a one inch I.D. combustion tube which was located in a resistance furnace. A thermocouple was pressed against the outside of the tube adjacent the aluminum wire and protected from direct heating by the furnace with asbestos cloth. Pure gaseous trichloromonofluoromethane was warmed slightly, then flowed through the tube at one atmosphere pressure and 400 cc./min. feed rate. The temperature of the furnace was gradually increased until the aluminum wire ignited, using visual observation of the wire. The temperature recorded by the thermocouple was 710° C. (1310° F.).

When an identical test was carried out, replacing the trichloromonofluoromethane with the azeotropic composition of this invention, i.e. containing 8% isopentane, the ignition temperature was 840° C. (1540° F.). Thus, the azeotropic composition has an ignition temperature of about 130° C. (240° F.) higher than pure trichloromonofluoromethane.

EXAMPLE 2

Example 1 was repeated using a mixture of 99.5% trichloromonofluoromethane and 0.5% by weight isopentane. The ignition temperature measured was 840° C. (1540° F.), and thus this mixture had an ignition temperature of about 130° C. (240° F.) higher than trichloromonofluoromethane itself.

EXAMPLE 3

The test of Example 1 was repeated, using 5 grams of iron wire in place of the aluminum wire. With a flow rate of 400 cc./min. of pure trichloromonofluoromethane, the ignition temperature observed was 650° C. (1200° F.).

Repeating the above test with iron wire under the same conditions, but using azeotropic composition of this invention containing 8% isopentane, gave an ignition temperature of 740° C. (1360° F.). Thus, the ignition temperature of iron wire was increased by 90° C. (160° F.).

EXAMPLE 4

Example 3 was repeated using iron wire as before, under the same conditions using a mixture of 99.5% trichloromonofluoromethane containing 0.5% isopentane. The ignition temperature was 740° C. (1360° F.) and was thus about 90° C. (160° F.) higher than trichloromonofluoromethane itself.

The azeotropic composition of this invention does not burn at room temperature. Burning matches did not ignite the surface of the liquid and they were extinguished by immersion in the liquid. Since azeotropes maintain constant composition when they are evaporated, there is no danger that this azeotropic composition could become flammable during slow evaporation, as through a leak in the containing system.

EXAMPLE 5

A flammability test was carried out using the closed drum test of the Interstate Commerce Commission (I.C.C.). This test consists in spraying the test material into a 1 inch open port located in one end of a 55 gallon, horizontally supported, oil drum which has a lighted candle near the center of the drum. If an explosion occurs before sixty seconds spraying time have elapsed, the I.C.C. classifies the product as flammable. If no explosion occurs within sixty seconds, the test is terminated and the I.C.C. classifies the product as nonflammable. When subjected to this test, the azeotrope of trichloromonofluoromethane and isopentane gave no explosion within sixty seconds. It is therefore nonflammable in the I.C.C. classification.

Other mixtures of trichloromonofluoromethane and isopentane, containing up to about 12% wt. of isopentane, also gave no explosion within sixty seconds in this drum test, and are rated nonflammable in this classification. On the other hand, those mixtures which contained 13% wt. or more of isopentane did give explosions in this test.

EXAMPLE 6

The flash points of various mixtures of trichloromonofluoromethane and isopentane were measured by the Tag open cup method, ASTM-D-1310. The results are shown in the table below.

Table

| Wt. percent isopentane: | Flash point, °F. |
|---|---|
| 10 | None |
| 12 | ---- |
| 13 | ---- |
| 14 | ---- |
| 15 | None |
| 16 | None |
| 18 | None |
| 19 | 0 |
| 20 | −15 |

The compositions of this invention can be prepared by mixing the components in the proper ratio or by fractionally distilling a mixture of trichloromonofluoromethane and isopentane as illustrated in the following example.

EXAMPLE 7

A mixture of 512 grams trichloromonofluoromethane and 60 grams isopentane was fractionally distilled through a 1 inch I.D. x 57 inch glass, vacuum jacketed and silvered fractionation column filled with glass helices, using a high reflux ratio. The first fraction (3 cc.) was a forerun containing low boiling impurities. Then a total of 173 cc. was collected having a constant boiling point of about 74.5° F., whereupon the distillation was stopped. Analysis of various cuts of this fraction indicated 91.8–92.2% by weight trichloromonofluoromethane and 7.8–8.2% by weight isopentane were present throughout. Thus, within analytical error, the composition was 92% trichloromonofluoromethane and 8% isopentane.

The azeotropic composition of this invention is of the minimum boiling point type, analogous to mixtures of ethyl alcohol and water. When fractionally distilling a mixture which forms a minimum boiling azeotrope, the azeotrope distills at a constant composition while the still pot becomes enriched with whichever component is in excess compared to the azeotropic composition. In the above Example 7, isopentane is in excess, whereby the trichloromonofluoromethane would be depleted first. Theoretically, the azeotrope distills until all of one component is gone. Practically, since distillation columns are never perfect, the azeotrope ceases to distill somewhat before one component is gone.

EXAMPLE 8

The vapor temperatures of mixtures of isopentane and trichloromonofluoromethane were measured at total reflux. The corresponding liquid temperatures were determined by fractionation through an 18 inch metal helices packed column at total reflux for several hours, after which approximately 3% of the charge was distilled over an additional several hours. The distillate, pot residue, and original charge were analyzed by vapor phase chromatography, giving the results shown below.

From the known vapor pressure/temperature data for trichloromonofluoromethane and for isopentane, the vapor temperatures of an ideal solution of the two under the same conditions was calculated by Raoult's law.

| Percent Isopentane in CFCl₃ | | B.P., ° C. at Atmospheric Pressure | | |
|---|---|---|---|---|
| Wt. | Mole | Liquid | Vapor | Vapor, Ideal Solution |
| 0 | 0 | 23.8 | 23.8 | 23.8 |
| 0.5 | 0.95 | 23.8 | 23.8 | >23.8 |
| 5 | 9.1 | 23.8 | 23.8 | 24.2 |
| 8 | 14.2 | 23.8 | 23.8 | 24.2 |
| 10 | 17.5 | 23.8 | 23.8 | 24.4 |
| 15 | 25.2 | 23.8 | 23.9 | 24.7 |
| 18 | 29.5 | 23.9 | 24.0 | 24.9 |
| 20 | 32.3 | 23.9 | 24.1 | 24.9 |
| 50 | 65.6 | 24.9 | 25.4 | 26.3 |
| 100 | 100 | 27.9 | 27.9 | 27.9 |

EXAMPLE 9

The velocity of sound for various mixtures of trichloromonofluoromethane and isopentane at atmospheric pressure (760 m. Hg pressure) and a temperature of 80° F. was calculated, and the percent increase in the velocity of sound over pure trichloromonofluoromethane is given in the following table.

| Percent Isopentane in Trichloromonofluoromethane | Percent Increase in Velocity of Sound Over Trichloromonofluoromethane |
|---|---|
| 0.5 | 0.2 |
| 5 | 1.6 |
| 8 | 2.6 |
| 10 | 3.2 |
| 15 | 4.8 |
| 18 | 5.8 |

It will be understood that the preceding description of the use of the compositions of this invention in centrifugal compressor refrigeration systems is given for illustrative purposes solely and that this invention is not limited to such specific embodiments. The compositions can be used for other purposes as indicated in the general description.

From the preceding description, it will be apparent that this invention provides novel compositions which have unusual properties and are useful for a wide variety of purposes. They are particularly useful in the operation of centrifugal compressor refrigeration systems, especially to replace pure trichloromonofluoromethane in such systems, wherein they exhibit unobvious and unexpected beneficial properties and advantages over pure trichloromonofluoromethane. Accordingly, it will be apparent that this invention constitutes a valuable advance in and contribution to the art.

The embodiments of the invention in which an exclusive property or privilege is claimed are defined as follows:

1. An azeotropic composition having a boiling point of about 74.5° F. at 760 mm. Hg pressure and consisting of (A) about 92% by weight of trichloromonofluoromethane and
(B) about 8% by weight of isopentane.

2. A composition which has a substantially constant boiling point at 760 mm. Hg pressure, whose vapor has a composition substantially the same as that of the liquid at that boiling point and which has no flash point when measured by the Tag open cup method, which composition consists of (A) from about 99.5% to 82% by weight of trichloromonofluoromethane and
(B) from about 0.5% to 18% by weight of isopentane.

3. A composition which has a substantially constant boiling point at 760 m. Hg pressure, whose vapor has a composition substantially the same as that of the liquid at that boiling point and which is nonflammable as determined by the I.C.C. closed drum test, which composition consists of (A) from about 99.5% to about 88% by weight of trichloromonofluoromethane and
(B) from about 0.5% to about 12% by weight of isopentane.

References Cited by the Examiner

UNITED STATES PATENTS

| 1,968,050 | 7/1934 | Midgley et al. | 252—67 |
| 2,942,942 | 6/1960 | Hoff | 23—65 |

FOREIGN PATENTS

| 148,874 | 7/1920 | Great Britain. |

ALBERT T. MEYERS, *Primary Examiner.*
JULIUS GREENWALD, *Examiner.*
J. D. WELSH, *Assistant Examiner.*